E. W. DAKIN & E. E. UNDERWOOD.
SHUTTER OPERATING DEVICE.
APPLICATION FILED OCT. 15, 1917.
1,297,327.
Patented Mar. 18, 1919.
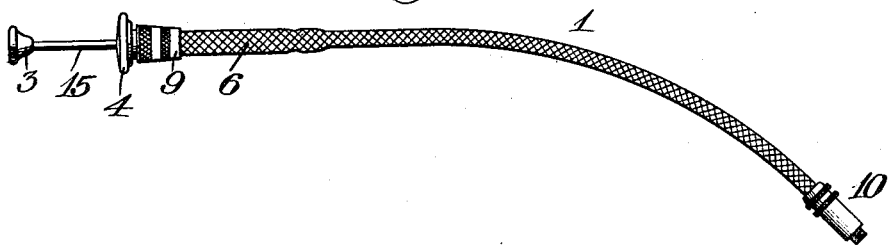
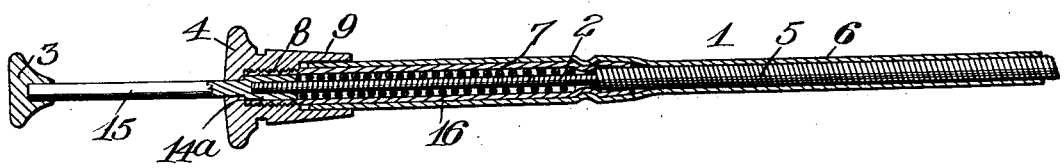
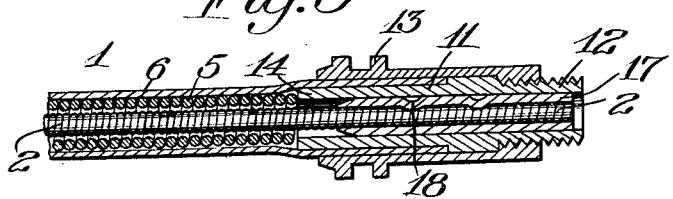

UNITED STATES PATENT OFFICE.

EDWARD W. DAKIN AND ERNEST E. UNDERWOOD, OF ROCHESTER, NEW YORK, ASSIGNORS TO EASTMAN KODAK COMPANY, OF ROCHESTER, NEW YORK, A CORPORATION OF NEW YORK.

SHUTTER-OPERATING DEVICE.

1,297,327.      Specification of Letters Patent.      Patented Mar. 18, 1919.

Application filed October 15, 1917. Serial No. 196,611.

*To all whom it may concern:*

Be it known that we, EDWARD W. DAKIN and ERNEST E. UNDERWOOD, of Rochester, in the county of Monroe and State of New York, have invented certain new and useful Improvements in Shutter-Operating Devices, and we do hereby declare the following to be a full, clear, and exact description of the same, reference being had to the accompanying drawings forming a part of this specification and to the reference numerals marked thereon.

Our present invention relates to photography and more particularly to shutter actuating devices of the type known as cable releases in which two laterally flexible members, one working within the other and terminating in relatively movable finger-pieces, are connected, respectively, to a shutter casing and an operating part thereof to afford a means for actuating the shutter without jarring the camera and in a convenient and comfortable manner and the invention has for its object to increase the flexibility of the members so that extreme distortions thereof will not result in permanent kinks or bends that would interfere with the relative sliding movement of the members. A further object of the invention is to improve the means of connecting the device to the shutter casing and to these and other ends the invention resides in certain improvements and combinations of parts all as will be hereinafter more fully described, the novel features being pointed out in the claims at the end of the specification.

In the drawings:

Figure 1 is a side view of a cable release constructed in accordance with and illustrating one embodiment of our invention;

Fig. 2 is an enlarged longitudinal sectional view of the outer end of the device, and Fig. 3 is a similar view of the inner end of the device.

Similar reference numerals throughout the several views indicate the same parts.

The device comprises an outer flexible casing or tubular guide indicated generally at 1 and an inner flexible cable 2 terminating at its outer end in a finger-piece 3. The outer end of the casing 1 is also provided with a finger-piece 4 and when these finger-pieces are pressed together the shutter is tripped or actuated as one of the members is connected to the shutter casing and the other to a controlling part of the shutter mechanism as will presently appear. In the present instance, the cable or inner member is a thrust member that is pushed against the shutter part and the casing takes the pull or reaction therefrom being connected to the shutter casing. The casing 1 must therefore be inextensible and to this end it embodies a helical wire coil 5 covered with a textile stocking 6 of inextensible weave. The outer end of the helix 5 is secured within the end of a sleeve 7 the opposite end of which is screwed into the finger-piece 4 at 8 while the stocking 6 is drawn over the sleeve 7 and secured between it and a collar 9 on the finger-piece 4 being preferably cemented to the sleeve.

At its inner end the casing 1 terminates in a tip indicated generally at 10. This tip preferably comprises an inner tube 11 threaded at 12 which threaded portion projects from a finger grip 13 in the form of a sleeve screwed onto the portion 12 to have a fixed relation to the tube. One end of the latter is reduced at 14 to receive the stocking 6 between it and the finger grip sleeve 13 which stocking is preferably cemented to the tube. By means of the part 13, the portion 12 of the tube 11 may be screwed into a suitable socket in the shutter casing. The inner end of the helix 5 abuts the end of the tube 11 being held there by the stocking.

The inner flexible cable 2 we also form of a closely wound incompressible wire helix which is extremely flexible laterally but is unyielding with respect to an endwise thrust against it. It is as flexible as the outer helix 5 and more so and hence will readily submit to any bending movement that its casing can undergo. At its outer end it is anchored in a head 14ª on the stem 15 of finger-piece 3 which stem is guided in finger-piece 4. A spring 16 coiled about the cable within the sleeve 7 bears at one end against said sleeve and at the other end against the head 14ª to normally hold the stem 15 and finger-piece 3 extended and the opposite end of the cable retracted, said head 14ª engaging against the finger-piece 4 to limit this movement.

The inner end of the cable 2 is fixed within a sleeve 17 shown in Fig. 3 as by prick punching said sleeve 17 at 18. This sleeve slides freely within the tube 11 the central bore of which is regular and continuous to provide a smooth guide. When the finger-pieces are pressed together and the cable is thrust through its casing the sleeve 17 constitutes an inflexible plunger of sufficient length to produce a direct thrust against the shutter operating member or trip without possibility of deflection.

A device constructed in accordance with our invention is efficient and serviceable and so supple as not to be disabled or its efficiency reduced by any twisting or bending which it would be apt to undergo even with careless use.

We claim as our invention:

1. In a shutter release, the combination with an outer flexible tubular casing and an inner flexible cable, both terminating at one end in finger-pieces, one member being incompressible and adapted to act as a thrust member against a shutter part and the other inextensible to take the reaction therefrom as the finger-pieces are moved relatively, of a tip at the other end of the casing member comprising a threaded inner tube having a continuous inner surface affording a smooth guideway for the cable and an outer sleeve fixed thereto and constituting a finger grip from which the threaded portion of the tube projects to take attachment to a shutter casing.

2. In a shutter release, the combination with an outer flexible tubular casing and an inner flexible cable, both terminating at one end in finger-pieces, one member being incompressible and adapted to act as a thrust member against a shutter part and the other inextensible to take the reaction therefrom as the finger-pieces are moved relatively, and a covering on the casing, of a tip at the other end of the casing member comprising a threaded inner tube having a continuous inner surface affording a smooth guideway for the cable and an outer sleeve fixed thereto and constituting a finger grip from which the threaded portion of the tube projects to take attachment to a shutter casing, said sleeve also acting as a securing means for the casing cover.

EDWARD W. DAKIN.
ERNEST E. UNDERWOOD.

Witnesses:
HELEN M. FRASER,
MARGARET DUIGNAN.